Aug. 20, 1946. H. MORGENROTH 2,406,239
LIQUID METERING AND DISTRIBUTING APPARATUS
Filed Feb. 27, 1943 4 Sheets-Sheet 1

Inventor
Henri Morgenroth
By Lyon & Lyon
Attorneys

Aug. 20, 1946.    H. MORGENROTH    2,406,239
LIQUID METERING AND DISTRIBUTING APPARATUS
Filed Feb. 27, 1943    4 Sheets-Sheet 3

Inventor
Henri Morgenroth
By Lyon & Lyon
Attorneys

Patented Aug. 20, 1946

2,406,239

UNITED STATES PATENT OFFICE 2,406,239

LIQUID METERING AND DISTRIBUTING APPARATUS

Henri Morgenroth, Los Angeles, Calif.

Application February 27, 1943, Serial No. 477,457

7 Claims. (Cl. 222—250)

This invention relates to apparatus for effecting distribution of liquids, and more particularly to feed systems for liquid fuel or other liquids.

One of the objects of the invention is to provide simple means for effecting distribution of equal quantities of liquid such as liquid fuel to different feed lines, or points of consumption, that is to say, so that all the points of consumption will receive equal quantities of the liquid or fuel.

While the invention would be useful in any situation where an equal distribution of this kind is to be effected, it is intended particularly for use in connection with fuel feed apparatus for internal combustion engines operating on liquid fuel, and in this connection one of the objects of the invention is to provide a compact construction or apparatus in which the fuel or liquid passing to the different points of consumption, is metered in a metering chamber with its distribution timed to adapt the same for feeding to the different injection nozzles of the working cylinders of an internal combustion engine.

A common type of injection system consists substantially of an individual injection pump for each working cylinder, and each pump is provided with a device to regulate the fuel delivery from that pump, means being provided to change the effective stroke of the piston, such as a helical groove in the piston, or other means. These means for changing the pump delivery of each pump unit, have to be coupled with each other so as to be adjusted simultaneously to effect delivery at all times of an equal charge into each pump. However, these adjustments make it possible to obtain equal fuel delivery at one load only; if for instance, the fuel delivery of all pump units is adjusted to be equal at full output, the delivered quantities may be erratic at partial loads since it is practically impossible to form a helical groove or construct such devices for varying the fuel delivery in such a way that the same will be absolutely identical at each pump unit. Furthermore, even if such a gang of pumps were constructed so as to deliver equal charges, it is obvious that the slightest unequal wear of the different individual driving parts for the pumps, would cause relative inequality in the amounts of fuel they would deliver. This objection is aggravated by the fact that the charge injected into each cylinder of internal combustion engines of a Diesel or semi-Diesel type for each stroke, is very small indeed, sometimes no more than a few drops.

A solution of the problem to provide equal fuel delivery to different points such as injection nozzles, has been attempted by using a single pump that delivers the fuel to all the nozzles through a distributor which connects the common pump with a plurality of nozzles one by one in succession. In other words, in a four-cylinder engine, for example, the four nozzles are fed with fuel by means of a distributor supplied from a common injection pump, the operation being such that the common injection pump is connected to one cylinder at a time on each working stroke, and consequently the pump is obliged to make four injection strokes for each revolution of the shaft of the engine. It is evident that such a system employing a single pump stroke for each engine cylinder, is certain to deliver equal amounts to the different nozzles at all loads, because only the delivery of one single pump unit has to be regulated. However, that system has only a limited application, which is to engines with very low revolution speeds for the shaft because the common pump unit has to run at a speed that is multiplied by the number of cylinders which it has to serve.

My invention as applied to a distributing system, for example, a multiple nozzle system, has for its object to provide a solution for this problem of fuel feed that involves the use of injection apparatus and a feed system practicable for high speed engines, a special object being to insure that the equal distribution of the fuel will occur for all speeds and different loads on the engine. According to the present invention, the pressure for the system may be developed by any means, for example, a common pump unit which constantly delivers fuel under pressure to one of my feed controls or injection control devices which include a reciprocating part, or a piston in a metering chamber that meters and delivers a certain definite quantity of fuel to the nozzles as the timing element of my control device connects the metering chamber to each nozzle being served.

The presence of accumulated gas or air bubbles in a feed system such as this is highly objectionable, particularly where the fuel is being metered or measured in a metering chamber, that is to say, a measuring chamber. Such bubbles of course would interfere with the accurate and efficient metering of the fuel. One of the objects of the invention is to provide an arrangement for the fuel ports or passages, and a method of using the same that will insure thorough scavenging of the passages and metering chamber at all times.

When apparatus constructed in accordance with this invention is employed for feeding volatile fuels such as gasoline, gas bubbles may tend to form in the feed line or metering chamber, which of course would be objectionable. One of the objects of the present invention is to provide simple means and a simple method associated with the operation of the feed line to the point of consumption which will prevent the volatilization of the fuel.

A further object of the invention is to provide simple means for varying the capacity of the metering chamber.

Further objects of the invention will appear hereinafter.

The invention consists in the novel parts and combination of parts to be described hereinafter, all of which contribute to produce an efficient liquid metering and distributing apparatus.

A preferred embodiment of the invention is described in the following specification, while the broad scope of the invention is pointed out in the appended claims.

In the drawings:

Fig. 3 is adapted for distributing equal quantities of fuel to a plurality of consumption points or nozzles in succession, the delivery ducts being disposed circumferentially around the periphery of the device.

Figs. 6, 7 and 8 illustrate an embodiment of the invention particularly adapted for serving multiple cylinder engines; in the construction illustrated, the capacity of the metering chamber is regulated through the agency of a movable plug that can be shifted toward or from the plunger or piston that reciprocates in the metering chamber to meter the liquid to the points of consumption. This embodiment of the invention as illustrated in Fig. 6, is also adapted to supply the liquid to a plurality of points of consumption or nozzles through the agency of the revolving rotor supplied with the liquid through a single supply line, and involves the use of two sets of delivery ducts located at different levels on the casing or stator. This view also illustrates a construction for the ends of the metering chamber and piston, enabling the piston to operate as a valve closure for the outlets from the metering chamber.

Figures 1, 2, 3, 4:
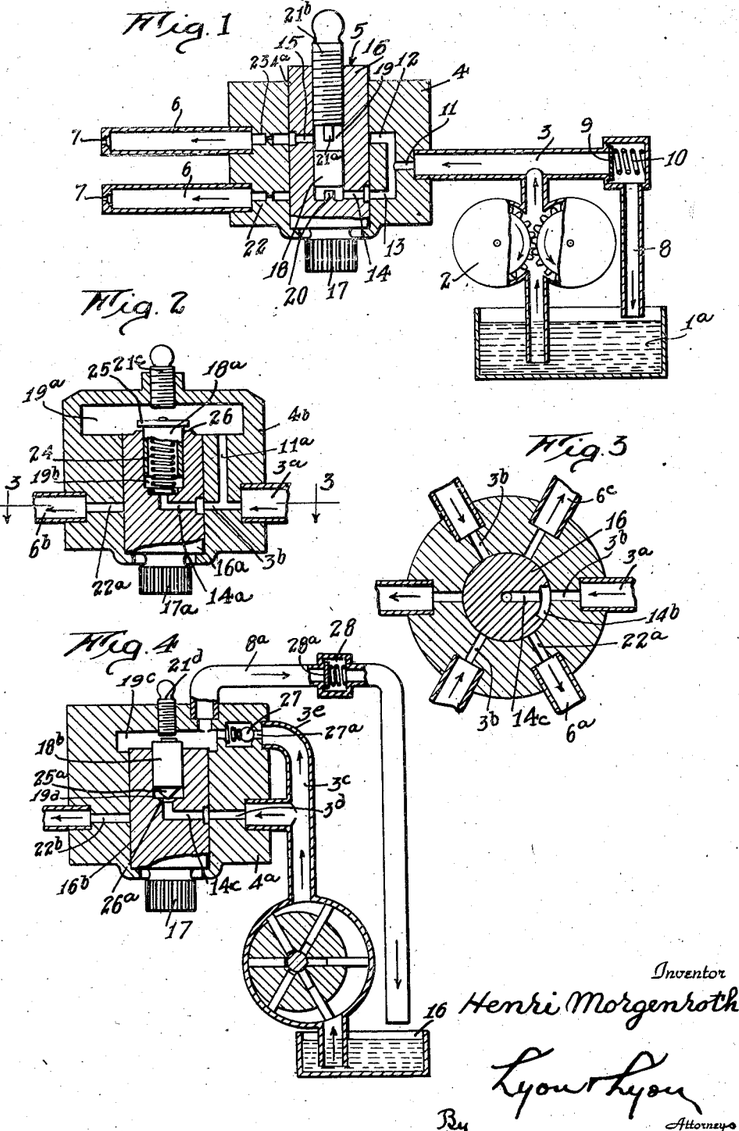
Fig. 1 is a vertical section through a double acting metering and distributing device embodying my invention, showing means for regulating the capacity of the metering chamber, and illustrating the same connected up to means for supplying the liquid such as liquid fuel, under pressure; this view shows two nozzles which this device supplies with equal quantities of fuel. This view also illustrates means which I prefer to employ in the feed lines to the distributing points or nozzles, when the apparatus is used in connection with a volatile fuel, which means operates to prevent volatilization of the fuel in the vicinity of the metering chamber.
Fig. 2 is a view similar to Fig. 1, but omitting the apparatus for supplying the liquid under pressure, and also showing a connection to a single nozzle. The device illustrated in Fig. 2 illustrates another embodiment of my invention in which the metering chamber is filled and emptied at one end only, being partially activated by a spring, whereas the device illustrated in Fig. 1 is double acting. The device illustrated in Fig. 2
Fig. 3 is a horizontal section taken on the line 3—3 of Fig. 2 and illustrates how the embodiment of the invention illustrated in Fig. 2, is adapted to supply equal quantities of liquid to a plurality of distribution points or nozzles through the medium of pairs of cooperating fuel inlets and outlets spaced around the periphery of the casing or stator.
Fig. 4 is a view similar to Fig. 1, certain parts being shown in elevation, and illustrating an embodiment of the invention in which the metering piston or plunger cooperates with the metering chamber to utilize one end of the chamber for metering the liquid passing through the device; and illustrating means associated with the device for controlling the movements of the movable member or piston merely by static pressures developed in the liquid, and without the necessity for employing the spring that is associated with the piston in the embodiment illustrated in Fig. 2.

Referring now to the drawings, in Fig. 1 I illustrate an embodiment of the invention in which the liquid 1 to be metered, is raised from a reservoir 1a by a pump 2 which may be of any type, but as illustrated is of a type known commonly as a gear pump. This pump delivers into a delivery duct or pipe 3 in which pressure can be raised to a predetermined limit as will be described hereinafter.

The duct or tube 3 delivers to a casing 4 having a bore 4a in which a rotor 5 is mounted for rotation on the axis of the bore 4a which, in the present instance, is vertical.

The casing 4 operates as a stator for supporting this rotor 5, and inlet and outlet ports are provided in these two parts enabling the liquid to be delivered through two delivery ducts or tubes 6 that deliver the liquid to points of consumption. In the present instance, these tubes 6 are constructed so that they constitute injection nozzles for injecting the liquid such as a liquid fuel, and for this purpose the delivery ends of these tubes are provided with restricted delivery ports 7.

Any desired working pressure is maintained in the inlet duct 3, and in the present instance, this is illustrated as consisting of a spring-loaded valve 9 held on its seat by a coil spring 10; when this valve opens at the limit of the desired pressure, the liquid is bypassed through the valve and through a return duct 8 back into the reservoir 1a.

In the construction illustrated, the inlet duct 3 delivers the liquid through an inlet port 11 in the stator or casing 4 which, in the present instance, is provided with two branches 12 and 13, each one of which serves one of the delivery ducts 6, and the rotor 5 includes a sleeve 16 and a shiftable plug 21, the purpose of which is to regulate the capacity of the metering chamber in the sleeve 16, as will be described hereinafter. This sleeve 16 for this purpose, is provided with two substantially radial ports or passages 14 and 15; the port 14 registers with the inlet branch 13 in the position of the sleeve illustrated in Fig. 1, and this will admit the liquid into the lower end of the metering chamber 19 that is formed as a coaxial bore in the sleeve 16, which bore is closed at its upper end by the aforesaid plug 21. A projection 20 extends up from the lower end of the chamber 19 to act as a stop for the downward movement of the movable member or piston 18, and a similar projection 21a may be provided at the lower end of the plug. These two projections 20 and 21a limit the movement of the piston 18 when the device is in operation. The stator 4 is provided with two delivery passages or ports 22 and 23 which are respectively in line with the ports 14 and 15, the latter of which aligns with the branch 12 of the inlet port 11.

Any suitable means may be provided for rotating the sleeve 16, and in the present instance, the lower end of this sleeve is provided with a coaxial gear wheel or pinion 17 which would be driven by some movable part, for example, in a motor, by some mechanism driven off of the motor shaft.

As stated above, Fig. 1 illustrates the sleeve 16 in a position to fill the lower end of the metering chamber 19 from the port 13, and the piston 18 is illustrated at the start of its upward travel toward the stop 21b.

After the piston or plunger 18 has arrived at the stop 21b, the lower end of the metering chamber 19 will have been filled to its capacity. After this occurs the port 14 will come into line with the delivery port 22, and when this occurs the port 15 will be in register with the branch port 12, which will admit the liquid to the upper end of the metering chamber 19 and force the piston 18 down, thereby discharging the measured charge through the port 14 which will then be in alignment with the outlet port 22. In this way the liquid, by reason of its own pressure and the cooperating features of the rotor and stator, pumps itself in measured charges alternately into the two delivery ducts 6, 6.

The quantity of liquid in each charge is of course regulated by shifting the capacity regulator plug 21 in or out in the outer end of the chamber 19. This of course may be accomplished by any means desired. In the present instance, the plug 21 may be provided with threads 21b which are received in corresponding threads in the upper end of the bore in the sleeve 16, the lower end of which forms the metering chamber 19. If desired, a check nut (not illustrated) may be employed on the projecting portion of the plug 21 to lock this plug in any desired position.

If the liquid being metered by the metering chamber 19 is sufficiently volatile under the temperature at which it is being metered, to vaporize in the ducts 12 and 13 and the chamber 19 when the same is filling, I provide a method and means for preventing such volatilization. This method consists in maintaining a pressure in the metering chamber 19 at all times above the pressure at which the liquid will volatilize at the prevailing temperature, that is to say, the temperature existing in the liquid in the metering chamber. This temperature of the liquid may be higher than the temperature of the adjacent walls, since the energy lost in the course of the liquid through the ducts, ports, etc., will be converted into heat. The means that I employ for accomplishing this is very simple indeed, and consists in providing a restricted outlet port 22a in the outlet duct 22, and a similar restricted outlet port 23a in the outlet duct 23. The diameter of these restricted outlets 22a and 23a is of course the same in another embodiment of the invention constructed as illustrated in Fig. 1, and can be accurately computed for any given liquid, the computations of course being based on the known characteristics of the liquid. The same effect can be attained by making the outlet port of sufficiently small diameter throughout its length, or a portion of its length.

It will be noted that in the embodiment of the invention illustrated in Fig. 1, the piston 18 advances the charge of liquid or fuel at each stroke; in other words, both ends of the metering chamber are employed for measuring the fuel. In Fig. 2 I illustrate an embodiment of the invention in which only one end of the metering chamber is employed in measuring the liquid, and the piston is returned by developing pressure on its outer end to return it and eject the metered or measured quantity of liquid. The embodiment illustrated in Fig. 2, employs means such as a coil spring for constantly urging the piston toward the outer end of its travel.

Referring to Figs. 2 and 3, 4b indicates the casing or stator corresponding to the stator 4, the interior of which receives the fuel through an inlet duct 3a. The stator 16a is a rotary sleeve fitting into a bore in the casing 4b, and is rotated on its axis by a pinion 17a. The duct 3a delivers the liquid into an inlet passage or port 3b with a lateral branch 11a that extends up to a chamber 19a; the bore that forms the metering chamber 19b constitutes a portion of the entire chamber 19a that is formed between the stator and the rotor 16a. The piston 18a is of tubular form with an enlarged head 25 at its upper end, that limits the downward movement of the piston. In other words, a boss 26 on the upper end of the rotor 16a operates as a stop for the piston. The coil spring 24 seated in a countersunk recess at the bottom of the metering chamber 19b, thrusts upwardly against the inner side of the head 25 and holds the piston up against a movable plug 21c for regulating the upstroke of the piston. A radial passage 14a is provided in the rotor 16 located in the plane of the inlet port 3b, and this passage 14a leads in to the lower end of the metering chamber 19b so that as the rotor 16a moves past the inlet passage 3b, the liquid or fuel will be admitted into the metering chamber 19b below the piston 18a and force the same upwardly against the capacity stop 21c. As illustrated in Fig. 3, the inlet and outlet ports for this device operate in pairs, and there may be as many of these cooperating pairs of these inlets and outlets as desired. In the present instance, Figs. 2 and 3 illustrate the use of three inlets and three outlets; the outlet ports being indicated by the reference numeral 22a, and being disposed intermediately between the inlet ports 3b. In Fig. 3 the arrows indicate the direction of flow of the liquid passing through the inlet ports 3b and out through the outlet ports 22a into their delivery ducts 6a. In the operation of this device shown in Figs. 2 and 3, it will be evident that as soon as the port 14a connects up with its corresponding port 22a, the pressure of the liquid under the piston, will immediately fall, and the piston 18a will then be immediately forced down by the pressure exerted in the upper portion of the chamber 19a. This force of course compresses the spring 24 as the piston moves down. When the port 14a of the rotor reaches the next inlet port 3b, another admission of fuel will take place in the metering chamber 19b and the cycle will be repeated.

The capacity regulator plug 21c may have any suitable means associated with it for adjustment in or out to limit the upward travel of the piston 18a.

The port 14a is preferably provided with an enlarged arcuate mouth 14b which, however, should not reach the outlet port 22a until cutoff occurs at the inlet port 3b.

The embodiment of the invention illustrated in Fig. 4 is in general somewhat similar to that illustrated in Fig. 2, that is to say, a supply duct 3c is provided with a lower branch to feed inlet port 3d and an upper branch 3e for maintaining pressure in the chamber 19c.

The metering chamber 19d extends down into the interior of the rotor 16b as in the construction shown in Fig. 2. At the point where the branch duct 3e delivers the fluid into the upper portion of the chamber 19c, means is provided for restricting or preventing reverse flow of the liquid from the upper portion of chamber 19c back into the branch duct 3e. This means could be merely a restricted opening 27 but if desired, may include a spring-actuated check valve 27. From the upper portion of the chamber 19c a return pipe 8a leads off, having a vertical leg, delivering returned liquid down into a reservoir 16 and this return pipe may be provided with a spring loaded relief valve 28 having a closure 28a that, under sufficient pressure in the upper portion of the chamber 19c, will open and permit a portion of the liquid to return to the reservoir. The upward movement of the piston 18b is of course controlled by the regulator plug 21d. The mode of operation of this embodiment illustrated in Fig. 4, is substantially the same as that of the embodiment illustrated in Fig. 2, that is to say, the down stroke of the piston 8b is caused by the excessive pressure existing in the upper portion of the chamber 19c when the radial port 14c moves around into line with the radial outlet port 22b; except that in the present instance, if desired the lower end of the piston 18b may be constructed with a valve closure 25a in its lower end to come upon the valve seat 26a through which the radial inlet port 14c emerges into the interior of the metering chamber 19d. The advantage of this construction illustrated in Fig. 4 with the bottom end of the piston 18b, is that the valve closure 25a positively prevents any leakage of the liquid past the piston 18a at the end of the down stroke.

Figure 5:
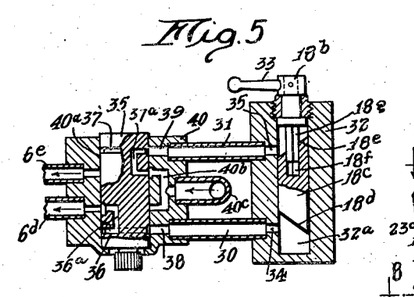
Fig. 5 is a view similar to Fig. 1, but illustrating an embodiment of the invention, showing that the metering chamber need not be incorporated directly with the rotor to effect the distribution of the liquid to different points of consumption, and this view illustrates another means for effecting the regulation of the capacity of the metering chamber at will. In this view certain parts are shown partially in elevation. This view illustrates two outlet ducts to which equal quantities of fuel are distributed as the rotor revolves.

In the practice of my invention it is not necessary to have the metering chamber inside of the rotor, nor it is necessary to employ the same means illustrated heretofore for regulating the effective capacity of the metering chamber. Such an embodiment of my invention is illustrated in Fig. 5, in which 32 indicates a stator which may be considered as a part of the stator casing, a portion of which consists of the casing section or body 40 that is a distinct part from the part 32 but connected with the same by two ducts 30 and 31. The casing section 40 is provided with a bore 40a in which a rotor 35 rotates. The lower end of this rotor has an annular groove 36 in its periphery that is always in communication with the passage 38 that leads in from the duct 30; and the upper end of the rotor has an annular groove 37 that is always in communication with the passage 39 that connects with the duct 31. Adjacent the upper end of the rotor 35 a D-shaped port 37a is provided, the upper end of which communicates with the groove 37, and the lower end of which may communicate with the upper branch of a branched inlet 40b; near the lower end of the rotor 35 a similar D-shaped passage 36a is provided, the lower end of which communicates with the groove 36, and the upper end of which may align with the lower branch of the port 40b. The two branches of the port 40b emerge into the bore 40a.

The casing section 40 has two outlet connections 6e and 6d, the former of which is in the same plane as the upper branch of the passage 40b, and the latter of which is in the same plane as the lower branch of the passage 40b. The fluid to be metered is supplied through a pipe 40c, the end of which is connected through the wall of the casing section 40 to deliver the liquid into the passage 40d.

In the position of the rotor 35 illustrated in Fig. 5, the liquid will flow through the upper D-shaped passage 37a, and through the tube 31 into the upper end of the metering chamber 32a formed in the casing section 32, and this will force the piston 18c downwardly, and this downward movement will continue until the lower end face 18d of the piston completely laps the port 34 which is in communication with the tube 30. This downward movement of the piston of course will expel the liquid charge that filled the lower end of the chamber 32a at the termination of the up-stroke of the piston 18c; this charge will flow out through the tube 30, port 38, annular groove 36, D-passage 36a, and thence to the delivery duct 6d. When the rotor 35 is oriented through 180°, the relation of the ports and passages will be reversed so that the liquid from the upper end of the metering chamber will exhaust through port 39, 37, D-passage 37a, and delivery duct 6e.

The upper end face 18e of the piston 18c is inclined like the lower face 18d, but these faces are inclined in opposite directions as illustrated. Associated with the piston 18c I provide means for maintaining the piston in any desired oriented position. As illustrated in Fig. 5, a maximum effective capacity of the metering chamber 32a will be obtained, but it is evident that if the piston 18c is held in a more or less oriented position, the effective length of the piston in the plane of the ports 34 and 35 of course would cause an earlier cut-off of these ports in the movement of the piston in one direction or the other. In order to orient the piston and maintain it in any desired oriented position, one end of the piston is provided with an angular socket 18f which slidingly fits over an angular stem 18g of similar cross-section, that extends down from a rotatable head 18h. This head 18h can be oriented in any desired position and held there by means of a lever or handle 33 projecting radially from the same. In practice, some means (not illustrated) would be provided for holding this lever or handle 33 in any desired position.

Figure 5A:
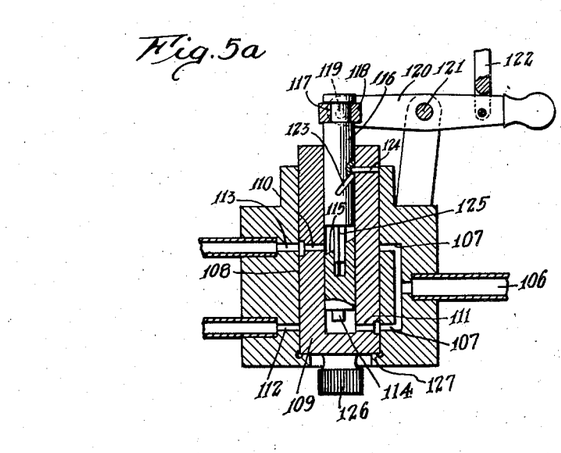
Fig. 5a is a view similar to Fig. 5 and illustrating a variation of the construction shown in Fig. 5 in which the metering chamber is formed within the rotor, and employing the same means illustrated in Fig. 5 for regulating the capacity of the metering chamber but with certain modifications of detail.

Although I have illustrated the piston 18c in Fig. 5, with inclined end faces, and employ the orienting means for the same to regulate or vary the effective capacity of the metering chamber 32, it should be understood that this inclined end principle can be employed in the more compact type of device illustrated in Fig. 1, and such an embodiment is illustrated in Fig. 5a. And furthermore, it should be understood that the plug type of regulator for controlling the amount of stroke of the piston 18 such as shown in Fig. 1, can be employed in the type of construction illustrated in Fig. 5 instead of the inclined end type of regulating means. This is illustrated in Fg. 5b. The preferred construction employed in Figs. 5a and 5b will be described in detail later.

It should furthermore be understood that one inclined face may be sufficient; that the inclined face can also have the form of a helix or other form, and that the wall may have this inclined and be of helical form.

Figure 6:
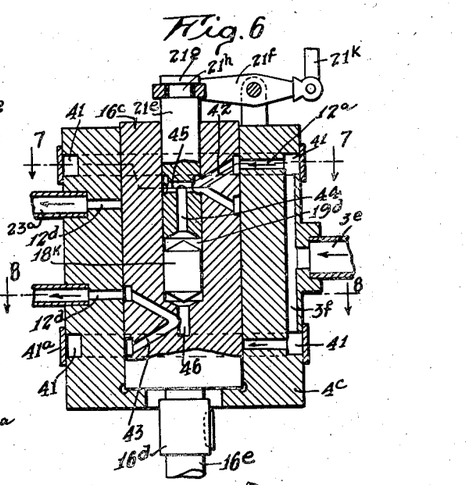
Figure 7:
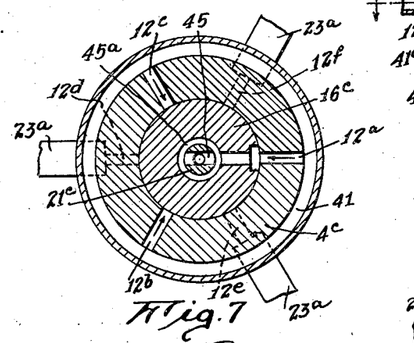
Fig. 7 is a horizontal section taken on the line 7—7 of Fig. 6, passing through the upper group of inlet ports of the stator.
Figure 8:
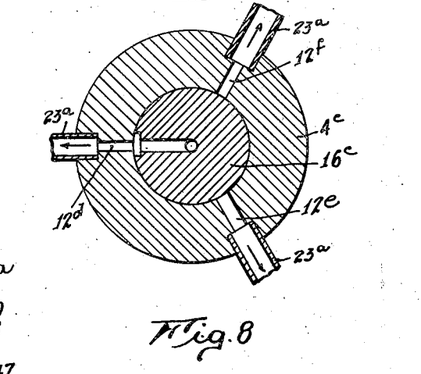
Fig. 8 is a view similar to Fig. 6, but passing through the lower group of outlet ports or delivery ports.

In Figs. 6, 7 and 8 I illustrate a type of construction which adapts itself for metering charges distributed to a plurality of points of consumption, such as a plurality of cylinders of an engine, and in the type of embodiment illustrated in Fig. 6, I illustrate still another means for regulating and controlling the effective capacity of the metering chamber, and I also provide an arrangement enabling two different sets of outlet passages to be employed; and while I do not limit myself to the number of individual delivery ducts of each set in Fig. 6, I have shown each set of delivery ducts as consisting of three individual ducts adapting the device to serve six cylinders.

Referring to Fig. 6, 4c indicates the stator in which the rotor 16c is located and arranged to be driven through a coupling 16d at the upper end of a shaft connection 16e. The fluid to be metered and distributed is admitted through an inlet connection 3e to a longitudinally disposed passage 3f in the stator 4c, and the ends of this passage communicate with two annular grooves 41 formed in the outer periphery of the stator, which of course is of cylindrical form. These grooves are covered by tight bands 41a which are fluid-tight. The annular grooves 41 communicate with three radial passages 12a, 12b, and 12c, as illustrated in Fig. 7, and these passages are located 120° apart. The stator is also provided with two sets of outlet ports indicated by the reference numerals 12d, 12e, and 12f, and the lower set of these ports is indicated in Fig. 8; but it should be understood that there is an upper set of these ports similarly placed to cooperate with the upper groove 41 while the lower set cooperates with the lower groove 41. These ports 12b are provided with outlet connections such as the outlet connection 23a. At two diametrically opposite points the rotor is provided with two substantially V-shaped passages 42 and 43, the arms of the V's of the said ports, however, being inclined with respect to a horizontal axis. The upper end of the upper branch of the passage 42 communicates with the "ring" or groove 41, and the lower end of the lower branch of this passage is in the plane of the outlets 12d, 12e, and 12f. At the lower end of the rotor 16c the lower end of the lower arm of the V port 43, communicates with the lower liquid ring or groove 41, and the upper end of the upper branch of this port is in the plane of the lower set of outlet ports 12d, 12e, and 12f.

The inner end of the V-shaped passage 43 communicates with the inner end of the metering chamber 19d. This may be accomplished through a small duct or coaxial well 26 that extends down from the lower end of the metering chamber. The upper end wall of the metering chamber 19d is formed by means of an axially shifting plug 21e that can be shifted longitudinally at will through the agency of a lever 21f having a swivel connection to a loose collar 21g that fits around a reduced neck 21h on the end of the plug 21e. This plug has a coaxial duct or well 44 extending in from its inner face and communicating with a cross port 45, and this cross port communicates with an annular groove 45a extending around the periphery of the plug 21e. This annular groove 45a intersects the vertex of the V port 42; with this construction it will be evident that the passages 12a, 12b, and 12c, are constantly supplied with liquid, and as the rotor rotates they will supply the liquid alternately to the ends of the metering chamber 19d. Fig. 6 illustrates the rotor in a position in which it is, when admitting liquid down through the port 44 into the upper end of the metering chamber, and forcing the piston 18k downwardly to expel the charge of liquid in the lower end of the chamber 19d into the upper branch of the V passage 43 and thence out through the outlet port 12d.

The lever 21f is provided with some means for holding it in any adjusted position desired, in which case it may be connected by a link 21k to a quadrant or lever, or other means for holding the link 21k in a fixed position.

In the rotation of the rotor 16c it will be evident that when it has been oriented through 180° from the position in which it is illustrated in Fig. 6, the upper branch of the V passage 43 will admit liquid from the lower groove 41 into the lower end of the metering chamber 19d, which will force the piston 18k upwardly and effect exhaust of the upper end of the metering chamber through the lower branch of the V passage 42 and the outlet port 12d. In other words, that position will be substantially the reverse of that illustrated in Fig. 6.

It will be evident that by shifting the plug 21e longitudinally in or out, the effective capacity of the metering chamber 19d can be regulated as desired.

Furthermore, if it is desired to insure that leakage of liquid past the piston 18k will be overcome in spite of wear occurring at the contacting periphery of the piston, the ends of the piston 18k can be formed into conical valve closures 18l coming upon the conical seats at the ends of the metering chamber such as illustrated.

Figure 9:
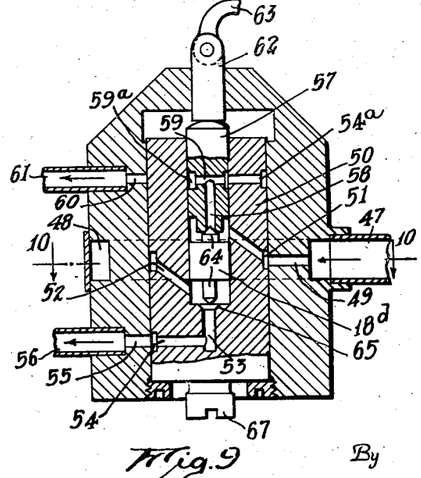
Fig. 9 is also a vertical section through an embodiment of the invention illustrating some of the features illustrated in Fig. 6, but utilizing a different form and arrangement of inlet and outlet ports in the rotor that are adapted to increase the scavenging effect of the incoming liquid.

In Fig. 9 I illustrate another embodiment of the invention which has some of the features of the construction illustrated in Fig. 6, but which is somewhat simpler as to port arrangement, and in this embodiment I employ an annular groove on, or in, the body of the stator, which supplies the liquid through simple ports not of V-form, to admit the liquid into both ends of the metering chamber, the outlet ports being spaced circumferentially in the stator and located intermediately between the inlet ports that lead in from the annular supply groove. In other words, the general arrangement of the inlet and outlet ports is substantially the same as that illustrated in Figs. 7 and 8, although of course as in the construction illustrated in Figs. 7 and 8, there may be if desired, a greater number of inlet ports in each set, and a greater number of outlet ports in each set of outlet ports. As illustrated in Fig. 9, the liquid is admitted through a pipe connection 47 into an annular groove 48 corresponding to the grooves 41 illustrated in Figs. 6 and 7. There are a plurality of ports such as the inlet port 49 corresponding to the ports 12a, 12b, etc., of Fig. 7. The rotor 50 is provided with two diametricaly opposite inlet ports 51 and 52 which are inclined in opposite directions, and both of these ports emerge on the face of the rotor 50 in the plane in which the inlet port 49 is located. The exhaust port or outlet port 53 of the lower end of the metering chamber, is located in the end wall of the metering chamber, and communicates with a radial passage 54 that is in line with the exhaust ports or outlet ports 55 that lead to pipe connections such as the pipe connection 56 for delivering the liquid to the point of consumption. The ports 51 and 52 need not necessarily be opposite each other. The important feature of the design is only that both ports are arranged in the same plane, and fed by the same ports.

The regulator for controlling the effective capacity of the metering chamber is in the form of a plug 57 which of course is of the same type as the plug 21e illustrated in Fig. 6 and having the same port arrangement as illustrated in Fig. 6, that is to say, it includes an outlet port 58 with a cross port 59 communicating therewith, and this cross port is in line with an outlet port 60 through the rotor leading the liquid to a pipe connection 61 similar to the pipe connection 56, and leading to another point of consumption. The plug 57 can be shifted in or out, and held in any desired position, for which purpose an adjustable stop or stem 62 is provided that is guided to slide in and out through the upper end of the stator where it may be connected to an operating part such as a lever 63. In practice this lever would be associated with a quadrant or some other means for holding it fixed in different positions. The piston 57 is always held up against the stop 62 by the pressure in the metering chamber.

In this embodiment of the invention if desired, the ends of the piston 18d may be constructed with valve closures in the form of tips 64 having conical end faces to come upon seats 65 formed at the mouths of the passages 53 and 58.

This construction illustrated in Fig. 9, has some advantages as compared with the construction illustrated in Fig. 6. It is simpler, and furthermore, it is advantageous to avoid the necessity of using the V-shaped ports. The construction shown in Fig. 9, also operates effectively to scavenge any gases such as vapors of the liquid, or air that might tend to accumulate in the ends of the metering chamber. This advantage arises from the fact that the flow in each port or passage in the stator and in the rotor, is always in the same direction.

The lower end of the rotor 50 is provided with a coupling head 67 to which a shaft may be coupled for driving the same in synchronism with the engine as in other embodiments of the invention.

In the operation of this device illustrated in Fig. 9, it will be evident that in the position of the rotor 50 illustrated, admission of the liquid under pressure from the passages 49 and 51, is taking place, and the piston 18d is at the upper end of its travel and about to commence its downward travel. As the piston moves down, it will force the liquid in the lower end of the metering chamber out through the vertical port 53 and the branch port 54 through the outlet connection 56. The construction is symmetrical so that a similar half cycle takes place when the upper end of the port 52 comes around into register with one of the inlet ports 49. This of course will fill the lower end of the metering chamber and force the piston 18d upwardly to the position in which it is illustrated in Fig. 9, thereby expelling the liquid in the upper end of the metering chamber out through the port 58 and the radial passage 54a that corresponds to the lower radial passage 54. At this moment the passage 54a will be in register with the outlet port 60.

The cross port 59 preferably communicates with an annular port 59a at its ends, which is similar to the annular port 45a illustrated in Fig. 7. This insures that communication will always be maintained from the port 58 to the periphery of the plug 57, and hence these ports will operate properly regardless of the number and location of the ports constituting the inlet and outlet sets of passages.

Figure 10:
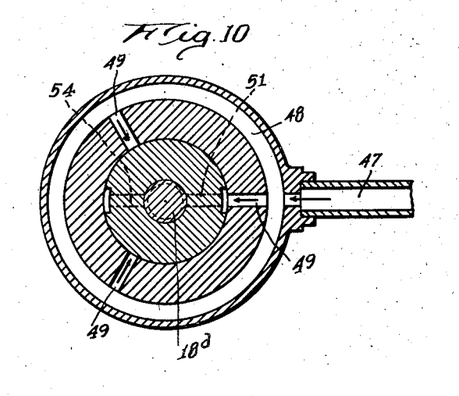
Fig. 10 is a horizontal section on the line 10—10 of Fig. 9, and further illustrating the inlet port arrangement.

Fig. 10, which is a section on the line 10—10 of Fig. 9, illustrates the port arrangement, but in Fig. 10 the port 51 shown in dotted lines, is of course actually located above the plane of the section line 10—10.

Figure 11:
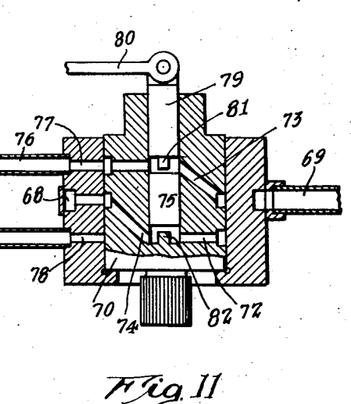
Fig. 11 is a vertical section illustrating a simple embodiment of the invention in which the ports in the stator and the rotor cooperate to deliver metered quantities of liquid to the individual ducts of two groups or sets of delivery ducts; in this embodiment the ducts are disposed so as to increase the scavenging effects of the liquid flowing into the metering chamber.

Of course, it is not essential to use the inclined port idea illustrated in Fig. 9, with the same port arrangement illustrated in Fig. 9, for admitting the liquid through the end walls of the metering chamber. A very simple construction utilizing the inclined ports, is illustrated in Fig. 11. In this figure an annular groove 68 is provided, into which the liquid is fed through a supply pipe 69, but in this case the rotor is provided with two diametrically opposite radial ports 71 and 72 that lead respectively into the ends of the metering chamber, and diametrically opposite to these ports 71 and 72, inclined outlet ports 73 and 74 are provided that lead out from the metering chamber and emerge on the face of the rotor in the plane of the annular supply port 68. The ports 73 and 74 of course are inlet ports, and the ports 71 and 72 are outlet ports, and the flow is always in the same direction in these ports. In the position illustrated in Fig. 11, the port 74 is admitting liquid into the lower end of the metering chamber and driving the piston 75 upwardly, and in this upward travel the piston is expelling the liquid in the upper end of the metering chamber through the port 71 leading to the outlet pipe connection 76. The circumferential arrangement of the ports is substantially as illustrated in Fig. 10. It is merely necessary to have the outlet ports 71 and 78 in vertical alignment with each other, and the pairs of these ports that are in vertical alignment with each other, are merely spaced equidistant circumferentially around the periphery of the stator. This embodiment illustrated in Fig. 11 is a very simple solution for the problem of providing a controllable metering means for controlling the effective capacity, and at the same time distributing the metering charges in succession to a plurality of points of consumption such as nozzles of an engine.

As is illustrated in Fig. 11 the control means for controlling the capacity of the metering chamber is in the form of a plug 79 similar to the plug 21 illustrated in Fig. 1, means such as a controllable lever 80 being provided and attached to the outer end of this plug for moving it in or out to any desired position. This plug may be provided with a tip 81 of reduced diameter to operate as a stop with the upward movement of the piston, and a similar stop 82 may be provided projecting up from the wall forming the lower end of the metering chamber. It will be noted that the flow of the liquid in these ports is always in the same direction, thus providing an effective scavenging.

Figure 12:
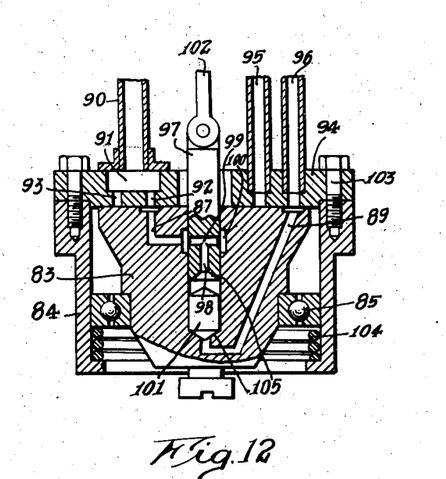
Fig. 12 is a vertical section through an embodiment of the invention in which the cooperating ports of the rotor and stator are located in a plane transverse to the axis of rotation of the rotor, and illustrates a construction and arrangement of parts enabling both ends of the metering chamber to be utilized in metering the charges of fuel passing to the different outlet ducts.

Although in all of the embodiments of the invention described above, the ports control the flow of the liquid passing in or out through the side of the rotor, it is not essential that the ports be disposed in that way; and in Fig. 12 I illustrate an embodiment of the invention in which the ports are located in a transverse plane, that is to say, in a manner which will enable the liquid to pass in and out through a cover plate abutting against the end of the rotor, the cooperating ports in the rotor being formed in this end face.

Referring to Fig. 12, the rotor 83 may be mounted for rotation within a casing or stator 84, being mounted on one or more bearings such as the ball bearing 85. The end face 86 of the rotor has two ports including the port 87 that serves the upper end of the metering chamber 88 and a port 89 that serves the lower end of the metering chamber. These ports emerge on the face 86 at different distances from the axis of rotation of the rotor. The ports 87 and 89 are located diametrically opposite to each other. The liquid is delivered through a supply connection 90 into a receiver 91 having a port 92 and a port 93, the former of which is the same distance from the axis of rotation as the port 87, and the latter of which is at the same distance from the axis of rotation as the mouth of the port 89 as it emerges on the face 86. The cover plate 94 that carries the inlet and outlet ports to serve the ports 87 and 89, has a pair of outlet connections 95 and 96, the latter of which can align with the port 89 as indicated in Fig. 13, and the former of which is located at the same distance from the axis of rotation as the port 87. The effective capacity of the metering chamber 88 is regulated by a regulator 97 in the form of a plug that can be guided in and out through the end face 86 of the rotor. This plug has a port arrangement similar to that illustrated in Figs. 6 and 9, that is to say, it has an axial port or passage 98 in its end communicating with a cross-port 99, and this cross-port communicates at all times with a chamber 100 which communicates with the inner end of the passage 87.

In the position of the parts indicated in Fig. 13, the liquid will flow in through the inlet connection 90 and down through the ports 87 and 98 into the upper end of the metering chamber 88 to force the piston 101 down to the lower end of the metering chamber in which it is indicated in Fig. 13, and while this is occurring the liquid is being forced out through the lower end of the metering chamber up through the port 89 and out through the outlet connection 96. When the rotor 83 is oriented through 180° from the position in which it is indicated in Fig. 13, the ports will be connected up in an opposite manner, that is to say, the port 89 will be in communication with the port 93, and that will admit liquid into the lower end of the metering chamber and force the piston 101 to the limit of its upward movement, that is to say, until its movement is arrested by the lower end of the plug 97. The upper end of the plug 97 in practice, would be connected to some part such as the link 102 which can be set and maintained in any desired position to hold the plug 97 in any adjusted position desired.

If desired, means may be provided for yieldingly pressing the cover plate 93 and the rotor 83 together so as to insure the presence of sufficient pressure between their contacting faces to discourage leakage of liquid in the crevice between these two faces. This could be accomplished by putting coil springs under the heads of the attaching bolts 103 in a common manner, with the lower ends of the springs pressing down against the upper face of the cover. In the present instance, however, I have illustrated a coil spring 104 seated at the inner end of the stator 84 and thrusting against the outer ring of the ball bearing 85. While I have illustrated the end face 86 for the rotor as a plane face, it is obvious that if desired, this face could be a conical face instead of a plane face, in which case the inner face of the cover plate 94 would of course be a conical face disposed at the same angle as the end face of the rotor. That construction would assist in centering the butt end of the rotor within the stator.

If desired, the end faces of the piston 101 may be made of conical form to operate as valve closures coming upon conical seats 105 formed at the bottom of the metering chamber and at the lower end of the plug 97 that forms the upper end wall of this chamber.

Figure 5B:
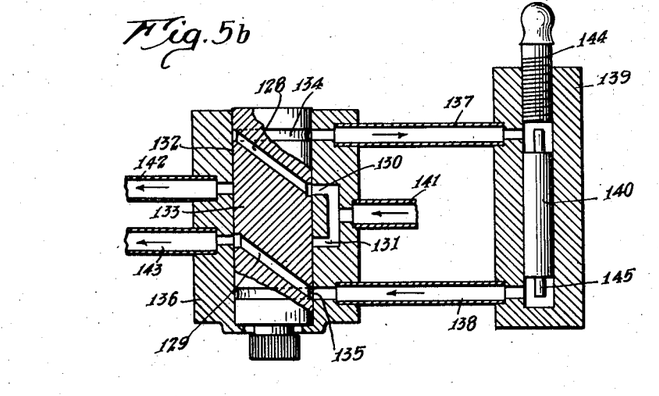
Fig. 5b is a view similar to Fig. 5 and illustrating a construction in which the metering chamber is not located within the rotor, but in which the means for regulating the capacity of the metering chamber is substantially the same as that illustrated in Fig. 1.

Reference is now had to Figs. 5a and 5b, the former of which illustrates a construction closely related to that illustrated in Fig. 5. However, Fig. 5a is used to demonstrate the fact that in using the inclined end type of regulator 18c for regulating the effective capacity of the metering chamber, it is not necessary to have the metering chamber located to one side of the rotor as in Fig. 5. In Fig. 5a the liquid is admitted through a supply connection 106 that admits the liquid into a D-shaped port with two branches 107 that emerge on the face of the bore 108 in which the rotor 109 seats. This rotor has an upper radial port 110 and a lower radial port 111, the former of which rotates in the plane of the inlet branch 107, and the latter in the plane of the lower branch 107.

Diametrically opposite to the inlet ports 107, two outlet ports 112 and 113 are formed radially in the stator, which connect up to outlet connections as indicated. In the position of the parts indicated in Fig. 5a, the liquid is being admitted to the lower end of the metering chamber to force the piston 114 upwardly and force the charge that is in the upper end of the metering chamber, out through the outlet port 110. In the opposite position of the parts, that is to say, when the rotor has been oriented through 180°, the port 110 will register with the upper inlet branch 107 and admit the liquid to the upper end of the metering chamber, and at the same time the port 111 will register with the outlet 112 so that the liquid admitted above the piston will force it down and expel the charge in the lower end of the metering chamber through the aligning ports 111 and 112. The piston 114 has an inclined upper face 115, and when this face laps the port 110, it will cut off flow through this port. As soon as this port is lapped, of course the upward movement of the piston 114 will be arrested. In order to enable the piston 114 to be oriented on its own axis to vary the effective length of the piston in the plane of the port 110, I employ the same kind of a control device as that illustrated in Fig. 5, that is to say, I provide a rotary part 116 which is in the form of a plug mounted for adjusting orientation in the upper end of the bore in the rotor 109. The upper end of this plug 116 has a swivel connection 117 in a collar 118 which has radial pins such as the pin 119 mounted for rotation in sockets in the fork end of an adjusting lever 120. This lever may be supported on a fulcrum pin 121, and adjusting means such as a link 122 connected to it for adjusting the lever and holding the same in any position desired. The side of the plug 116 has a helical slot 123 into which projects the inner end of a pin 124 mounted radially in the wall of the rotor 109. With this arrangement of parts it will be evident that if the plug 116 is moved in or out it will be oriented on its axis, and this orienting movement through the agency of an angular stem 125 socketed in the piston 114, will cause an orientation of the piston.

In connection with Fig. 5a, it should be understood that although I have described only two inlet ports and two outlet ports located diametrically opposite to each other, it is obvious that in this type of construction the same circumferential spacing or arrangement of ports may be adapted if desired, having the typical features of arrangement illustrated in Figs. 3, 7 and 8. In other words, the number of these cooperating ports would be increased to adapt the device to serve as many points of consumption, or nozzles, as required.

The construction shown in Fig. 5b is also closely related to that shown in Fig. 5. The construction shown in Fig. 5b is illustrated to show that the metering chamber located as it is, removed from the rotor, it is not essential to employ the inclined face type of control device for regulating the effective capacity of the metering chamber. However, in Fig. 5b the port arrangement for the rotor is somewhat different from that illustrated in Fig. 5, employing inclined ports 128 and 129 instead of the D-shaped ports in Fig. 5. However, a D-shaped admission passage is employed so that two branch inlets 130 and 131 emerge on the face of the bore 132 in which the rotor 133 rotates. The ends of the inclined ports 128 and 129 communicate with annular grooves 134 and 135 located adjacent the ends of the rotor. The stator section 136 in which the rotor 133 rotates, has two pipe connections 137 and 138 communicating respectively with the grooves 134 and 135, and these lead over to the stator section 139 in which the metering chamber is located and in which the piston 140 reciprocates. The inlet branch ports 130 and 131 are supplied with liquid through the pipe connection 141, and diametrically opposite to these branches two outlet connections 142 and 143 are located. In the operation of the construction illustrated in Fig. 5b, it will be evident that in the position illustrated, the liquid will flow through the inlet branch 130 up through the upper inclined port 128 and thence in the groove 134 to the connection 137 which leads into the upper end of the metering chamber, thereby forcing the piston 140 downwardly and expelling the charge in the lower end of the metering chamber through the connection 138, the lower inclined port 129, and the outlet connection 143. The effective capacity of the metering chamber in this case, can be regulated by the regulating plug 144 constructed like the plug 21 illustrated in Fig. 1, and functioning in the same way.

The ends of the piston 140 can be provided with short coaxial stems 145 which operate as stops to arrest the up and down movements of the piston. These stops also operate to prevent the body of the piston from overlapping the ports in the stator section 139 that are in line with the pipe connections 137 and 138.

This arrangement of the metering chamber can be combined with any of the port arrangements shown in the other figures.

Many other embodiments of the invention may be resorted to without departing from the spirit of the invention.

What I claim is:

1. In a liquid fuel feeding apparatus, the combination of a relatively fixed casing having a bore therein, a rotor rotatably mounted in the bore, and having a metering chamber therein, a movable member associated with the metering chamber, movable to and fro to effect the filling and emptying of the same, said rotor and said casing having ports for admitting the liquid to the metering chamber to fill the same to its effective capacity, and for effecting the discharge of the fuel from the chamber thereafter, and means for regulating the effective capacity of the metering chamber, said ports for admitting the liquid to the metering chamber including a port located in the end wall of the chamber and having a valve seat formed around the same, the adjacent end of the movable member having a tip to come upon said seat to prevent leakage of the fuel under pressure through the port from the chamber when the movable member has moved to the limit of its movement toward said seat.

2. A liquid fuel feeding apparatus, comprising: a casing defining a rotary arbor bore, a pressure chamber at one end of said bore, delivery ports communicating with said arbor bore and said pressure chamber, and a plurality of discharge passages likewise intersecting said arbor bore; an arbor rotatably mounted in said arbor bore and defining a socket communicating with said pressure chamber and a passage adapted to register in succession with said delivery ports and discharge passages; means for maintaining fuel under pressure in said pressure chamber and supplying fuel under pressure to said delivery port; a floating plunger in said socket forming therewith a metering chamber; means establishing an unbalanced force urging said plunger toward said pressure chamber to fill said metering chamber when said metering chamber is in communication with said delivery port; said plunger adapted to be urged by the fluid pressure in said pressure chamber in a direction to empty said metering chamber when in communication with said discharge passages.

3. A liquid fuel feeding apparatus, comprising: a casing defining a rotary arbor bore, a pressure chamber at one end of said bore and alternate delivery and discharge passages intersecting said bore at circumferentially spaced points; an arbor rotatably mounted in said bore and defining an axial wall of said pressure chamber, said arbor having a socket therein likewise exposed to said pressure chamber and a passage leading from said socket to the periphery of said arbor for communication in succession with said delivery and discharge passages; means for maintaining a constant supply of fuel under pressure to said passages and to said pressure chamber; a floating plunger in said socket, one end exposed to said pressure chamber, the other end defining with said socket a metering chamber; and means effective when said metering chamber is in communication with said delivery passages for urging said plunger toward said pressure chamber to expand said metering chamber, said plunger being urged by the pressure in said pressure chamber to discharge fluid therefrom when in communication with said discharge passages.

4. A fuel feeding apparatus as set forth in claim 3 wherein: the passage in said arbor communicates with the axial end of said socket and forms therewith a valve seat; and said floating plunger is provided with a coacting valve element adapted to engage said seat.

5. A fuel feeding apparatus as set forth in claim 3 wherein: the discharge passages are provided with constructions therein to maintain a back pressure in said metering chamber to prevent volatilization of fuel therein and the consequent forming of gas pockets therein.

6. A fuel feeding apparatus as set forth in claim 3 wherein: the discharge passages are provided with constructions therein to maintain a back pressure in said metering chamber to prevent volatilization of fuel therein and the consequent forming of gas pockets therein, and wherein the passage in said arbor communicates with the axial end of said socket and forms therewith a valve seat; and said floating plunger is provided with a coacting valve element adapted to engage said seat.

7. A liquid fuel feeding apparatus comprising: a rotary arbor having an axially directed socket in one end and a flow passage communicating between said socket and a side wall of said arbor; means defining an arbor bore journalling said arbor; means defining a pressure chamber embracing the socket end of said arbor; delivery passages communicating with said arbor bore and said pressure chamber; discharge passages likewise intersecting said arbor bore; said passageway adapted to register in succession with said delivery and discharge passages as said arbor is rotated, and said pressure chamber being in constant communication with its delivery passage; a floating plunger in said arbor socket forming therewith a metering chamber; means incorporating said plunger for sealing said passageway from said pressure chamber when said plunger is in its inner position with respect to said socket; means establishing an unbalanced force urging said plunger toward said pressure chamber to fill said metering chamber when said metering chamber is in communication with said delivery port; said plunger adapted to be urged by the fluid pressure in said pressure chamber in a direction to empty said metering chamber when in communication with said discharge passages.

HENRI MORGENROTH.